H. J. SCHMID.
Egg-Poacher.
No. 210,154. Patented Nov. 19, 1878.
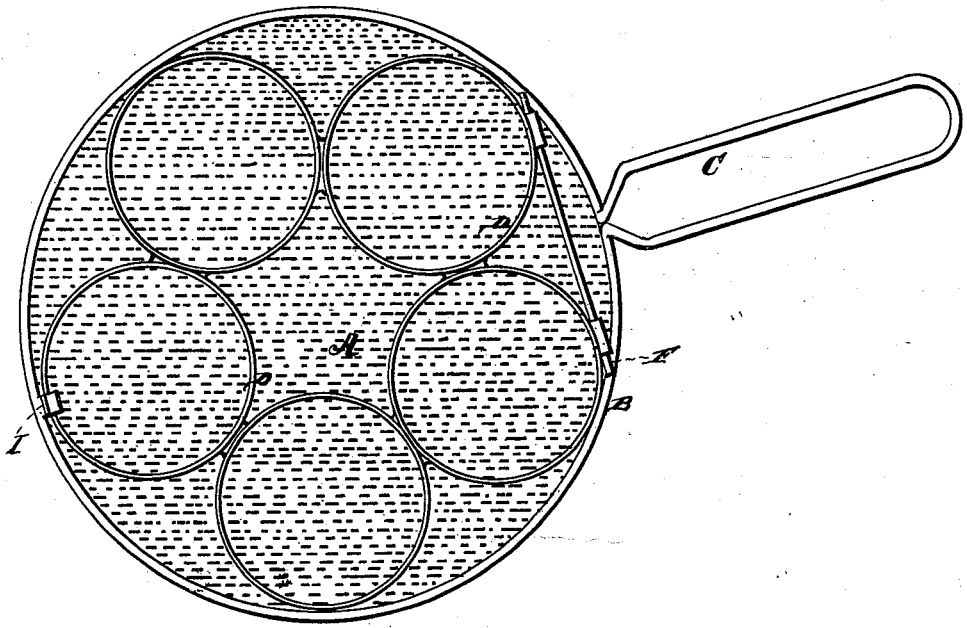
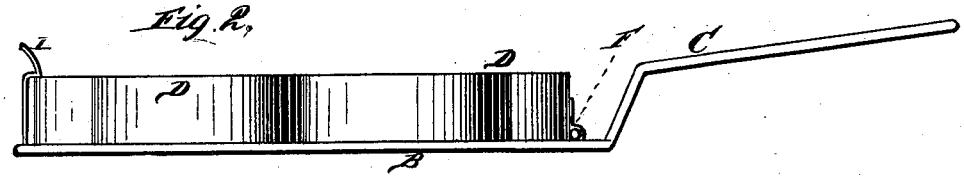
WITNESSES
Robert Orcutt
James J. Sheehy
INVENTOR.
Hattie J. Schmid.
By Gilmore, Smith & Co.
ATTORNEYS.

UNITED STATES PATENT OFFICE.

HATTIE J. SCHMID, OF OLNEY, ILLINOIS.

IMPROVEMENT IN EGG-POACHERS.

Specification forming part of Letters Patent No. 210,154, dated November 19, 1878; application filed August 17, 1878.

*To all whom it may concern:*

Be it known that I, HATTIE J. SCHMID, of Olney, in the county of Richland and State of Illinois, have invented a new and valuable Improvement in Egg-Poachers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of my egg-poacher, and Fig. 2 is a side elevation view of the same.

The nature of my invention consists in the construction and arrangement of a device for poaching eggs, as will be hereinafter more fully set forth.

The annexed drawing, to which reference is made, fully illustrates my invention.

A represents a perforated sheet-metal plate, preferably in circular form, and of any desired dimensions. This plate is bound around the edge with a wire, B, which on one side is formed into a handle, C, or any suitable handle may be connected to the plate.

D D represent a series of sheet-metal rings fastened together by soldering or otherwise, in such a manner that they can all rest upon the plate inside of the rim B. This cluster of rings is hinged at one side to a rod, F, fastened to the rim B, and on the opposite side is a spring-catch, I, for holding them down on the plate.

This device is used in the following manner: Boiling water is placed in a skillet or frying-pan, sufficient to come nearly to the top of the rings D. The poacher is then set inside in the water and an egg broken into each ring, and allowed to remain until done. Then lift the poacher out and let the water drain off. Then raise the rings and the eggs will be in a nice shape and convenient to put on a plate or dish.

By the use of my invention none of the egg is wasted. The eggs are in a nice round shape for the table, they are easily removed, and will not get broken up.

What I claim as new, and desire to secure by Letters Patent, is—

The combination of the perforated plate A, the cluster of rings D, hinged to the plate, and a catch, I, substantially as and for the purpose set forth.

In testimony that I claim the above I have hereunto subscribed my name in the presence of two witnesses.

HATTIE J. SCHMID.

Witnesses:
ADEN KNOPT,
JOHN SCHMID.